April 29, 1930.    W. H. MARSH    1,756,491
FLOW INDICATOR
Filed Sept. 30, 1929
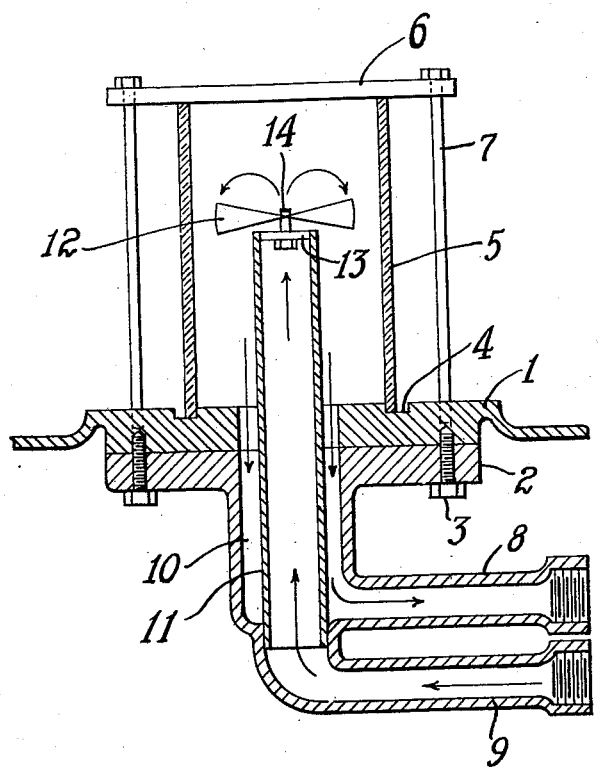
INVENTOR
Walter H. Marsh
by William B. Jaspert
Attorney.

Patented Apr. 29, 1930

1,756,491

UNITED STATES PATENT OFFICE

WALTER H. MARSH, OF PITTSBURGH, PENNSYLVANIA

FLOW INDICATOR

Application filed September 30, 1929. Serial No. 396,081.

This invention relates to flow indicators, more especially to visible indicating means for the outlet conduit of gasolene dispensing pumps or the like.

It is among the objects of this invention to provide a flow indicator of simple and compact construction which shall be efficient in its operation and positive in its action to properly indicate the flow of fluid therethrough.

Another object of the invention is to provide an indicator in which the fluid is conducted into the visi-gauge and withdrawn therefrom from its bottom portion only and through concentric passages, thus assuring the operation of the impeller or indicating member.

In the accompanying drawing constituting a part hereof and in which like reference characters designate like parts, the single figure is a cross sectional view of the flow indicator embodying the principles of this invention.

In the drawing, 1 constitutes a base or bracket which may be secured to the main housing of the dispensing pump; 2 is a flanged bracket secured by bolts 3 to the housing portion 1. The member 1 is provided with an annular groove 4 adapted to receive a glass tube or cylinder 5 which is clamped in the groove 4 by a disk 6 having bolts 7 extending therethrough and interacting with threaded portions provided in the bracket element 1. The usual sealing gaskets may be employed at the ends of the glass cylinder or tube to hermetically seal the inner chamber of the tube to prevent the escape of liquid therefrom.

The lower bracket 2 is provided with a pair of conduits 8 and 9, the latter constituting the inlet passage to the gauge and the former the outlet passage.

The conduit passages 8 and 9 terminate in a cylindrical chamber 10 in which is disposed a metallic tube 11 which is secured to form a sealed joint with the inlet conduit 9. The tube 11 projects vertically through the opening of the bracket 1 into the glass tube 5 thereby forming a concentric passage or outlet from the tube 5 to the conduit 8.

An impeller 12 is mounted on a spider 13 to be freely rotatable thereon about a pivot 14, the supporting member 13 being perforated or provided with spaced radial arms to permit the free flow of the fluid through the tube 11 into the chamber of the glass tube 5.

The operation of the flow indicator is briefly as follows: The conduit 9 is connected to the outlet of the meter pump so that the fluid dispensed by the pump flows through the conduit 9 upwardly through the tube 11 and into the chamber 5, thence downwardly through the concentric passage 10 around the tube 11 and out at the conduit 8 at which point the flexible dispensing hose or conduit is connected.

In passing upwardly through the central passage of tube 11 and thence downwardly through the concentric passage 10, the fluid will rotate the impeller 12 as long as it continues to flow out at the outlet conduit 8, thus giving a visible indication that the pump is primed and operating to its full capacity.

With the construction of flow-indicator herein employed, the visible indicator is positive in its action since there are no distorted passages for the flow of fluids which set up eddy currents detrimental to the proper operation of the impeller member.

Although one embodiment of the invention has been herein illustrated and described, it will be obvious to those skilled in the art that various modifications may be made in the details of construction without departing from the principles herein set forth.

I claim:

1. A flow indicator comprising a supporting bracket having a glass cylinder clamped thereon forming a fluid chamber, an inlet conduit passing vertically into said chamber and an outlet passage concentric with said inlet passage at the bottom of said chamber, and means within said chamber for indicating flow of fluid therethrough.

2. A flow indicator comprising a supporting bracket having a glass tube clamped thereon forming a fluid chamber, a plurality of conduits communicating with the cylindrical passage at the bottom of said chamber, a conduit extending vertically from one of said first named conduits into the fluid chamber forming a concentric passage therearound communicating with the other of said pair of conduits and an impeller mounted on said vertical conduit member within the chamber to indicate the flow of fluid therethrough.

In testimony whereof I have hereunto set my hand this 28 day of September, 1929, at Pittsburgh, Pa.

WALTER H. MARSH.